US011397857B2

(12) United States Patent
Drzewucki et al.

(10) Patent No.: US 11,397,857 B2
(45) Date of Patent: Jul. 26, 2022

(54) METHODS AND SYSTEMS FOR MANAGING CHATBOTS WITH RESPECT TO RARE ENTITIES

(71) Applicant: INTERNATIONAL BUSINESS MACHINES CORPORATION, Armonk, NY (US)

(72) Inventors: Michael Drzewucki, Woodbridge, VA (US); Renee F. Decker, Brunswick, MD (US); James M. Dixius, Fairfax, VA (US); David Kenneth Sagal, II, Keyser, WV (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 16/743,810

(22) Filed: Jan. 15, 2020

(65) Prior Publication Data
US 2021/0216714 A1    Jul. 15, 2021

(51) Int. Cl.
G06F 40/295    (2020.01)
G06N 20/00    (2019.01)
H04L 51/02    (2022.01)
G06F 40/30    (2020.01)
G06N 7/02    (2006.01)
H04L 51/04    (2022.01)

(52) U.S. Cl.
CPC ............ *G06F 40/295* (2020.01); *G06F 40/30* (2020.01); *G06N 7/02* (2013.01); *G06N 20/00* (2019.01); *H04L 51/02* (2013.01); *H04L 51/04* (2013.01)

(58) Field of Classification Search
None
See application file for complete search history.

(56) References Cited

U.S. PATENT DOCUMENTS

| 9,330,084 B1 | 5/2016 | Kadambi et al. |
| 9,582,757 B1 | 2/2017 | Holmes et al. |
| 10,073,833 B1 | 9/2018 | Beller et al. |
| 10,303,999 B2 | 5/2019 | Hertz et al. |
| 2018/0039889 A1* | 2/2018 | Nanavati ............... G06F 16/951 |
| 2018/0260383 A1* | 9/2018 | Beller .................... G06F 40/35 |

(Continued)

FOREIGN PATENT DOCUMENTS

| CN | 101097573 A | 1/2008 |
| EP | 1941399 A2 | 7/2008 |

OTHER PUBLICATIONS

"A Method and System to Use Question Answering Engine to Improve Information Extraction", IPCOM000233160D; IP.com Electronic Publication Date: Nov. 26, 2013, (5 Pages).

(Continued)

Primary Examiner — Antim G Shah
(74) Attorney, Agent, or Firm — Griffiths & Seaton PLLC

(57) ABSTRACT

Embodiments for managing chatbots are provided. A set of documents is received. A plurality of entities are identified within the set of documents. At least one of the plurality of entities is selected based on a rareness criteria. Contextual data associated with each of the selected at least one of the plurality of entities is identified within the set of documents. At least one question-answer (QA) pair associated with each of the selected at least one of the plurality of entities is generated based on the identified contextual data.

15 Claims, 7 Drawing Sheets

(56) References Cited

U.S. PATENT DOCUMENTS

2020/0050942 A1* 2/2020 Sun .................. G06F 40/40
2020/0327196 A1* 10/2020 Sampat ............... G06F 40/35

OTHER PUBLICATIONS

"Automatic In-Domain Question/Answer-Set Generation", IPCOM000245124D; IP.com Electronic Publication Date: Feb. 10, 2016, (5 Pages).

"Method and System for Processing and Answering Factual Questions Over Structured Data", Shirwadkar et al., IPCOM000258994D; IP.com Electronic Publication Date: Jul. 2, 2019, (6 Pages).

"Continuous Improved Conversation Entities", IPCOM000254529D; IP.com Electronic Publication Date: Jul. 10, 2018, (4 Pages).

"Complex Sequential Question Answering: Towards Learning to Converse Over Linked Question Answer Pairs With a Knowledge Graph", Saha, A. et al.; The Thirty-Second AAAI Conference on Artificial Intelligence (AAAI-18), (9 Pages).

"Anaphora Reasoning Question Generation Using Entity Coreference", Hasegawa et al.; (4 Pages).

"Zero-Shot Question Generation From Knowledge Graphs for Unseen Predicates and Entity Types", Elsahar, et al.; arXiv:1802.06842v1 {cs.CL] Feb. 19, 2018, (11 Pages).

"Generating Natural Language Question-Answer Pairs from a Knowledge Graph Using a RNN Based Question Generation Model" Sathish Indurthi et al: Proceedings of the 15th Conference of the European Chapter of the Association for Computational Linguistics: vol. 1, Long Papers, pp. 376-385, Valencia, Spain, Apr. 3-7, 2017.

"Automating Reading Comprehension by Generating Question and Answer Pairs" Vishwajeet Kumar et al., arXiv:1803.03664v1 [cs. CL] Mar. 7, 2018.

"Automatic Question and Answer Generation from Course Materials" A.S.M Nibras et al., International Journal of Scientific and Research Publications, vol. 7, Issue 11, Nov. 2017 ISSN 2250-3153.

"Generating Questions and Multiple-Choice Answers using Semantic Analysis of Texts" Jun Araki et al., Proceedings of COLING 2016, the 26th International Conference on Computational Linguistics: Technical Papers, pp. 1125-1136, Osaka, Japan, Dec. 11-17, 2016.

* cited by examiner

METHODS AND SYSTEMS FOR MANAGING CHATBOTS WITH RESPECT TO RARE ENTITIES

BACKGROUND OF THE INVENTION

Field of the Invention

The present invention relates in general to computing systems, and more particularly, to various embodiments for managing chatbots with respect to rare entities.

Description of the Related Art

Chatbots, also known as talkbots, chatterbots, bots, instant messaging (IM) bots, interactive agents, Artificial Conversational Entities (ACEs), voice response systems, etc., are computer nodes (i.e., devices and/or programs) or artificial intelligence modules which are able to, for example, conduct conversations with individuals (or users) and/or provide other types of functionality through auditory (e.g., speech/voice) or text-based methods. For example, with such systems equipped with "question answering" functionality (i.e., question answering systems), users may ask questions, and the system may respond based on its knowledge base and/or by analyzing the question, providing the best answer it can generate.

Question answering systems (or other chatbot-like systems that are configured to perform such functionality) are often make use of question-answer (QA) pairs to train (or generate) models that are utilized to train the system on how to respond to user inquiries and test the system. In some instances, thousands of QA pairs are required to train systems for particular domains (or topics, subjects, etc.). This process may be very labor and time intensive. This may be particularly true when attempting to generate valid and useful questions related to entities that are mentioned only a few times in a given corpus (i.e., collection of documents ingested to generate QA pairs).

SUMMARY OF THE INVENTION

Various embodiments for managing chatbots are provided. A set of documents is received. A plurality of entities are identified within the set of documents. At least one of the plurality of entities is selected based on a rareness criteria. Contextual data associated with each of the selected at least one of the plurality of entities is identified within the set of documents. At least one question-answer (QA) pair associated with each of the selected at least one of the plurality of entities is generated based on the identified contextual data.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
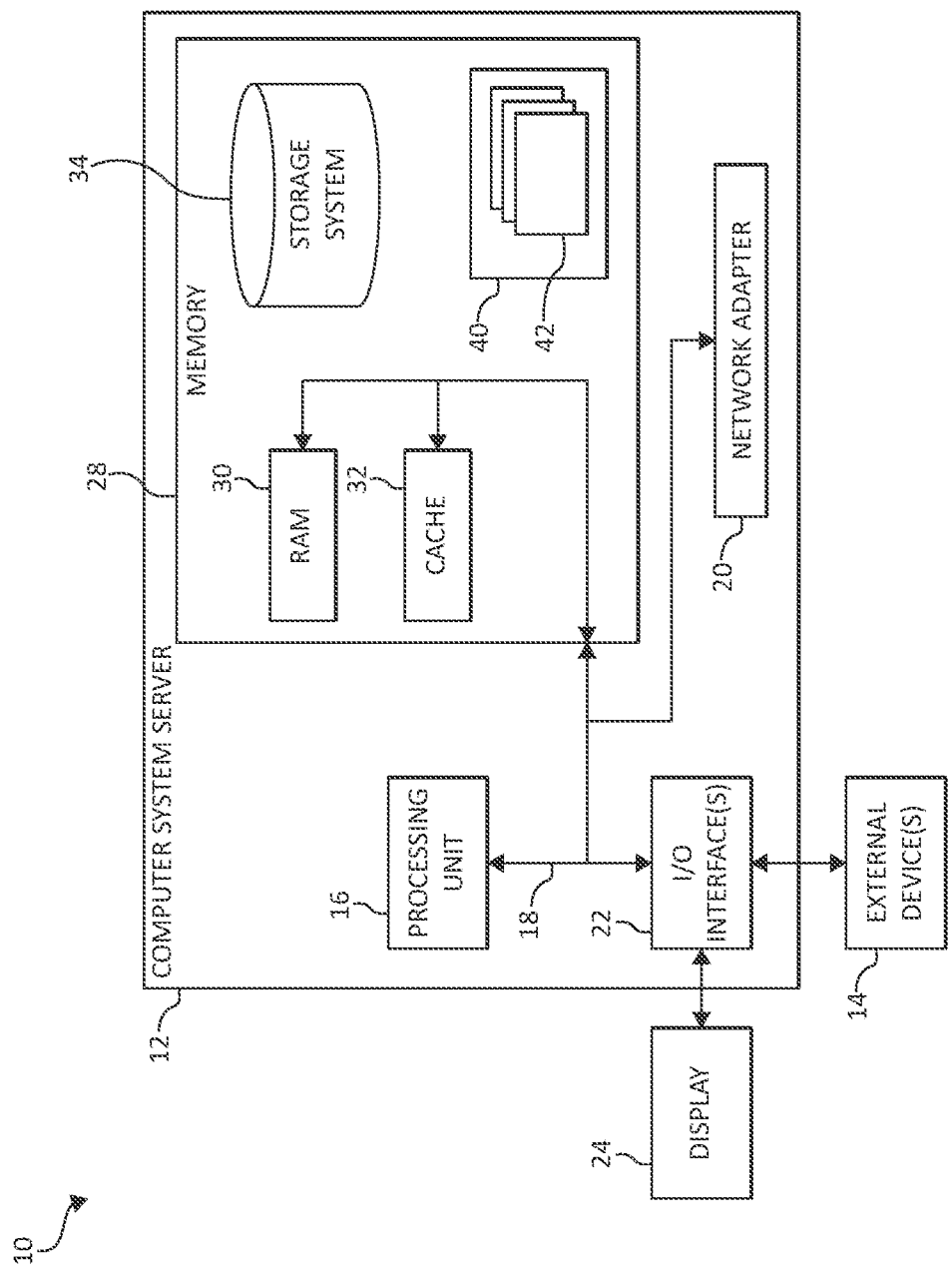
FIG. 1 is a block diagram depicting an exemplary computing node according to an embodiment of the present invention.

As discussed above, chatbots, also known as talkbots, chatterbots, bots, instant messaging (IM) bots, interactive agents, Artificial Conversational Entities (ACEs), voice response systems, etc., are computer nodes (i.e., devices and/or programs) or artificial intelligence modules which are able to, for example, conduct conversations with individuals (or users) and/or provide other types of functionality through auditory (e.g., speech/voice) or text-based methods. For example, with such systems equipped with "question answering" functionality (i.e., question answering systems), users may ask questions, and the system may respond based on its knowledge base and/or by analyzing the question, providing the best answer it can generate.

Question answering systems (or other chatbot-like systems that are configured to perform such functionality) are often make use of question-answer (QA) pairs to train (or generate) models that are utilized to train the system on how to respond to user inquiries and test the system. In some instances, thousands of QA pairs are required to train systems for particular domains (or topics, subjects, etc.). This process may be very labor and time intensive. This may be particularly true when attempting to generate valid and useful questions related to entities that are mentioned only a few times in a given corpus (i.e., collection of documents ingested to generate QA pairs).

To address these needs and/or the shortcomings in the prior art, in some embodiments described herein, methods and/or systems are disclosed that, for example, manage chatbots (and/or other similar systems) in such a way to improve the performance thereof and/or facilitate their training with respect to "rare" entities (e.g., entities that are referenced and/or mentioned less than a particular number of times in the given set of documents or corpus).

Although some embodiments described herein are referenced with respect to "chatbots" or "chatbot systems," it should be understood that the methods and systems described herein may be applied to various types of computing systems to which a user provides a question, command, etc., and the system generates an answer or response. Other examples include, but are not limited to, question answering systems, talkbots, chatterbots, bots, instant messaging (IM) bots, interactive agents, Artificial Conversational Entities (ACEs), voice response systems, and search engines (e.g., Internet search engines).

In some embodiments, a corpus (e.g., one or more document, perhaps related to a particular domain) is received (or retrieved, identified, etc.) and processed (or "ingested"). In particular, entities (e.g., individuals, objects, locations, etc.) within the corpus are identified (or extracted), and perhaps labeled with an associated lexical entity type. "Rare" entities are then selected from the identified entities and used to generate questions and answers (or question-answer (QA) pairs) based on the context with which those entities are found within the corpus (e.g., contextual information associated with the rare entities within the corpus). In some embodiments, the methods and systems described herein focus on the automated generation of the questions/answers after ingestion of a corpus has been completed.

The methods and systems described herein may save a considerable amount of time with respect to the generation of QA pairs used to train, test, etc. chatbot-like systems for new domains. Additionally, the number of individuals needed to perform the manual task of reading documents and generating QA pairs may be reduced. Further, QA pairs are generated in a consistent manner, as opposed to having significant variations due to multiple, different individuals generating the QA pairs, and the quality of the questions (or OA pairs) may be improved due to an automated system creating the questions using a repeatable process without (or at least with reduced) human variation. Also, the methods and systems described herein may reduce the need for subject matter experts to generate questions with respect to particular domains.

More particularly, in some embodiments, a corpus is first identified, received, etc. and ingested/processed. During the ingestion, entities are extracted, and a "type" for each of the entities may be determined (e.g., based on contextual data within the corpus), as will be appreciated by one skilled in the art. The "frequency" of each of the entities within the corpus may also be determined. That is, the system may count (and/or keep track of) the number of references to (or mentions of) each of the entities (e.g., each time a name or other descriptor referring to an entity appears in the corpus).

In some embodiments, the entities are then evaluated against a "rareness" criterion (or criteria) and/or at least some of the entities are selected as rare entities within the corpus. For example, in some embodiments, rare entities are defined as those of the extracted entities that are referenced less than a first (or maximum) predetermined threshold and more than a second (or minimum) threshold. As a more specific example, the rare entities may be selected as portion (e.g., a percentage) of the least occurring entities within the corpus (e.g., if a total of 100 entities are identified, the 10 entities with the fewest references or the "bottom" 10% are selected as the rare entities), perhaps so long as those entities are referenced more than a minimum number of times (e.g., more than one reference). The rareness criteria may be a configurable setting (e.g., via a setting/preferences functionality).

In some embodiments, a list of the entities selected as rare entities is generated and provided to the user (e.g., rendered in a user interface, by a computing device, etc). The user may then be provided with the ability to adjust the selection of the rare entities (e.g., remove and/or add entities to the list). Also, the system may search the corpus for matches to the rare entities (e.g., regardless of whether or not the user adjusts the list of rare entities). For example, a "fuzzy" matching algorithm may be utilized, which may take into consideration entity types (e.g., if an entity discovered via the fuzzy matching is of a type different than that of the respective rare entity, it may not be considered a match). Additionally, any entities discovered utilizing the fuzzy matching that have high reference counts (e.g., higher than the rareness criteria) may be discarded (or the user may be provided with an opportunity to discard or keep such entities via the user interface).

In some embodiments, the system (also) generates a list of "near miss" rare entities, which may be utilized by the user to further adjust the rare entities for which QA pairs are generated. For example, if the initial identification of rare entities included entities that are referenced more than once in the corpus and less than the bottom n percent (e.g., 10%), the system may provide a list of entities that are referenced more than once and less than the bottom n+x percent (e.g., 10%+1%). The user may then opt whether or not to include such entities in the QA generation process.

After the list of rare entities is determined (perhaps including the user modifications described above), contextual data associated with each of the rare entities is identified within the corpus. It is then determined whether or not such contextual data indicates that a question (or query) may be asked (or submitted) with respect to the contextual data (e.g., whether or not a "who is . . . ," "what is . . . ," "how much . . . ," "how many . . . ," etc. question be asked about the entity).

One or more question that is answered by (or related to) the identified contextual data is then generated for each of the rare entities (or at least the rare entities for which appropriate contextual data is identified). In other words, one or more QA pair is generated for each rare entity (if possible). In some embodiments, this process includes capturing (or tracking/storing) the particular document from which each question (or QA pair) was generated. In some embodiments, if possible, additional/multiple forms of each question are generated (e.g., utilizing known question forms/templates, utilization of detected/available acronyms, etc.).

At least some of the aspects of functionality described herein may be performed utilizing a cognitive analysis (or machine learning technique). The cognitive analysis may include natural language processing (NLP) and/or natural language understanding (NLU) (or NLP/NLU technique, such classifying natural language, analyzing tone, and analyzing sentiment (e.g., scanning for keywords, key phrases, etc.) with respect to, for example, content (or data), communications sent to and/or received by users, and/or other available data sources. In some embodiments, Mel-frequency cepstral coefficients (MFCCs) (e.g., for audio content detected by a microphone), and/or region-based convolutional neural network (R-CNN) pixel mapping (e.g., for object detection/classification in images/videos), as are commonly understood, are used.

The processes described herein may utilize various information or data sources associated with entities, users, and/or content. For example, the data sources may include, but are not limited to, communication sessions and/or the content (or communications) thereof (e.g., chatbot interactions, phone calls, video calls, text messaging, emails, in person/face-to-face conversations, etc.), a profile of or basic information (e.g., job title, place of work, length of time at current position, family role, etc.), a schedule or calendar (i.e., the items listed thereon, time frames, etc.), projects (e.g., past, current, or future work-related projects), location (e.g., previous and/or current location), social media activity (e.g., posts, reactions, comments, groups, etc.), browsing history (e.g., web pages visited), and online purchases.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, managing and/or training chatbots, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such as a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by such computing devices.

Additionally, although particular embodiments and examples described herein may describe chatbot systems as being utilized via spoken or audible communications (e.g., utterances), it should be understood that the methods and systems described herein may be applied to similar systems in which the communications are provided via text-based methods (e.g., using a keyboard). Further, it should be understood that the methods and systems described herein may be applicable to any computing system/device or application that performs various types of tasks (e.g., besides answering questions, conducting conversations, etc.) in response to receiving such communications, such as controlling IoT devices, playing media, placing online orders, etc.

In particular, in some embodiments, a method for managing a chatbot, by a processor, is provided. A set of documents is received. A plurality of entities are identified within the set of documents. At least one of the plurality of entities is selected based on a rareness criteria. Contextual data associated with each of the selected at least one of the plurality of entities is identified within the set of documents. At least one question-answer (QA) pair associated with each of the selected at least one of the plurality of entities is generated based on the identified contextual data.

The identifying of the plurality of entities may include determining a number of references to each of the plurality of entities within the set of documents. The selecting of the at least one of the plurality of entities based on the rareness criteria may include selecting those of the plurality of entities for which the number of references within the set of documents is less than a first predetermined threshold and greater than a second predetermined threshold.

The selecting of the at least one of the plurality of entities based on a rareness criteria may include associating a first of the plurality of entities with a second of the plurality of entities based on a fuzzy matching algorithm. The first of the plurality of entities may have a first number of references in the set of documents, and the second of the plurality of entities may have a second number of references in the set of documents. The second number of references may be added to the first number of references to calculate a composite number of references for the first of the plurality of entities. The composite number of references may be utilized to determine if the first of the plurality of entities meets the rareness criteria.

A user interface that allows a user to modify the selecting of the at least one of the plurality of entities may be provided. The identifying of the contextual data associated with the selected at least one of the plurality of entities within the set of documents may include identifying contextual data associated with the modified at least one of the plurality of entities. The generating of the at least one QA pair may include generating a QA pair associated with each of the modified at least one of the plurality of entities.

A chatbot system may be caused to be trained utilizing the generated at least one QA pair. Each of the plurality of entities may include at least one of an individual, an object, and a location.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
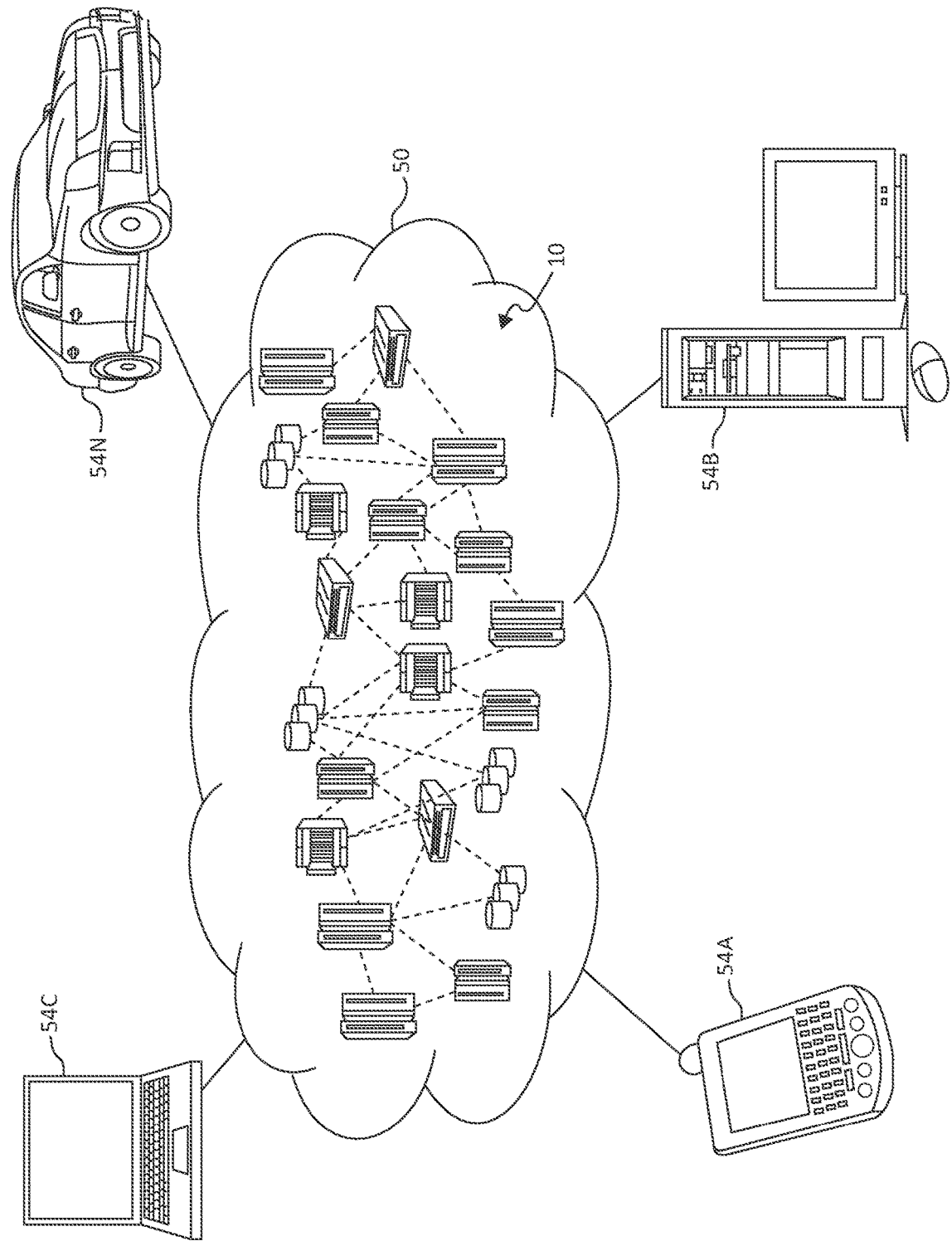
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
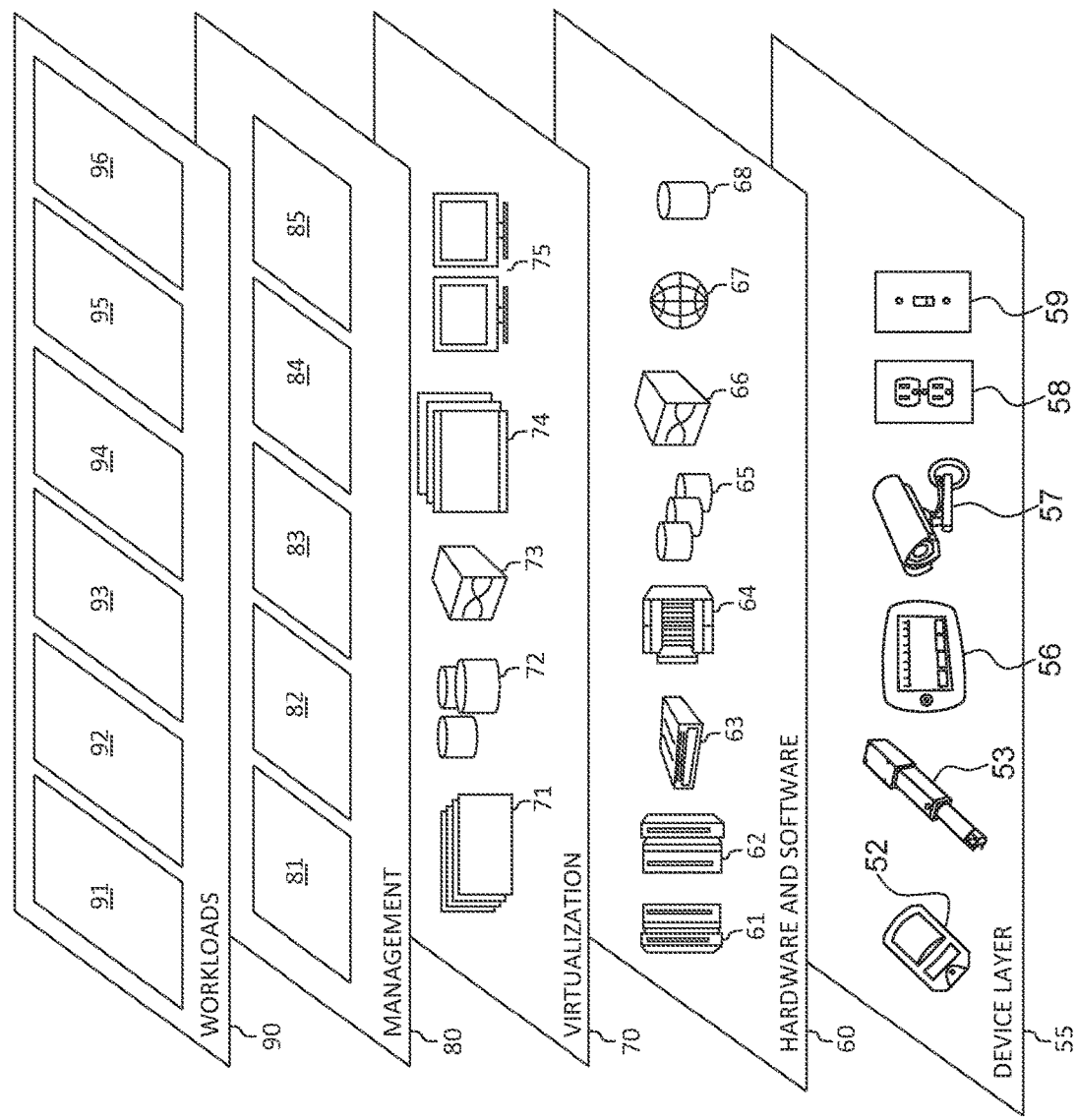
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and/or training chatbots, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided for managing (and/or training) chatbots (or other similar systems). In some embodiments, a corpus (e.g., one or more document, perhaps related to a particular domain) is received (or retrieved, identified, etc.) and processed (or "ingested"). In particular, entities (e.g., individuals, objects, locations, etc.) within the corpus are identified (or extracted), and perhaps labeled with an associated lexical entity type. "Rare" entities are then selected from the identified entities and used to generate questions and answers (or question-answer (QA) pairs) based on the context with which those entities are found within the corpus (e.g., contextual information associated with the rare entities within the corpus).

Figure 4:
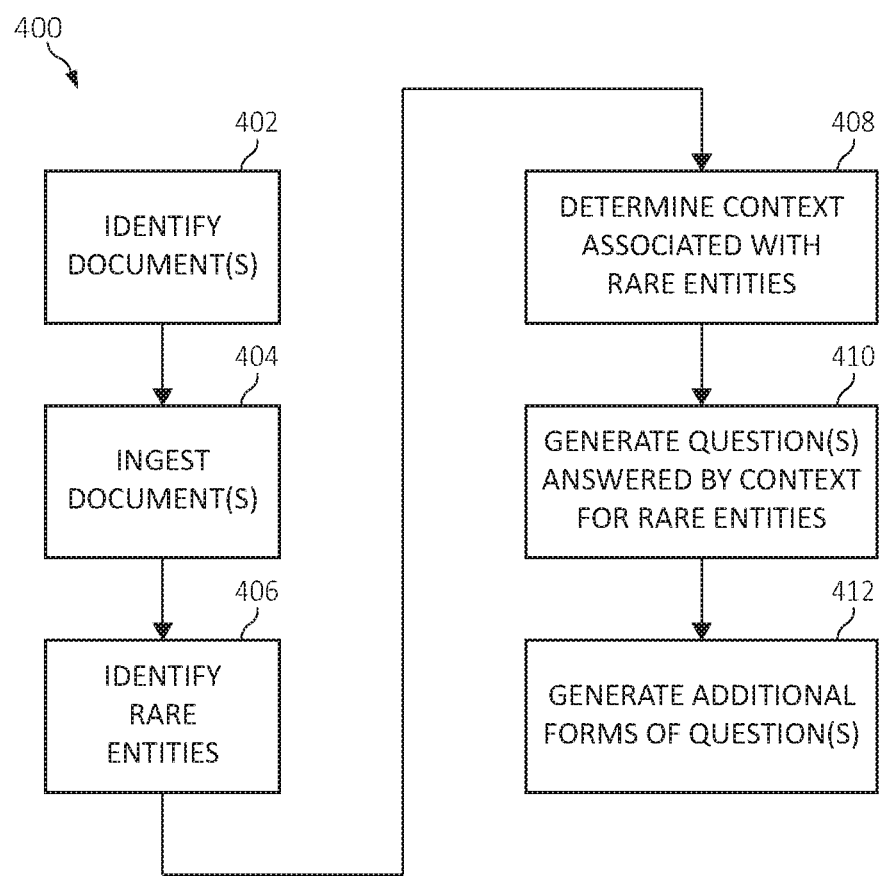
FIG. 4 is a block diagram of a method for managing chatbots according to an embodiment of the present invention.

FIG. 4 illustrates an exemplary method (and/or system) 400 for managing chatbots according to an embodiment of the present invention. At block 402, one or more documents (or a set of documents or corpus) is identified (or selected, received, retrieved, etc.) by, for example, a computing system (e.g., a cognitive module) performing the functionality described herein. The document(s) may include one or more of any type of suitable document, file, database, etc., such as unstructured documents, websites, word processing documents, spreadsheets, electronic communications (e.g., emails, text messages, etc.), audio/video files, etc., that may be accessed and/or is/are searchable by the computing system performing the functionality described herein.

At block 404, the document(s) are ingesting and/or processed via, for example, a NLP or NLU technique, as is commonly understood. The processing of the documents may include identifying and/or extracting entities and determining a "type" for each entity. Entity types (and/or entities) may include, for example, persons/individuals, objects, locations/addresses, organizations, events, works of art, consumer goods, phone numbers, dates/times, number, prices, etc. In some embodiments, the processing of the documents also includes determining a frequency for each of the identified entities. That is, the system may count/keep track of the number of references to and/or mentions of each of the entities (perhaps accounting for spelling errors, typographical errors, appositives, pronouns, etc.), as will be appreciated by one skilled in the art.

At block 406, rare entities are identified (or determined, selected, etc.) from the entities identified within the documents. As is described in greater detail below, rare entities may be defined and/or determined utilizing a rareness criterion (or criteria, algorithm, calculation, formula, etc.) that is based on entity frequency and/or mention count, perhaps combined with, for example, user input and the use of a matching algorithm.

At block 408, context (or contextual data/information) associated with the rare entities (e.g., each of the rare entities if possible) is determined or identified within the documents. The contextual data may include terms, phrases, etc., such as nouns, noun phrases, verb, verb phrases, and other descriptors, that are found "near" or "around" mentions of the rare entities within the documents, which provide information or "context" about the entities. For example, contextual data may appear in the same sentence, phrase, paragraph, etc. as an entity mention and/or within a predetermined "distance" of an entity mention (e.g., based on word count, alphanumeric character count, appearance in the previous or next sentence, etc.). Also at block 408, it may be determined whether or not the identified contextual data indicates a question or query that may be asked/posed related to the entity (e.g., "who is . . . ," "what is . . . ," "how much . . . ," "how many . . . ," etc.) and/or whether or not the contextual data includes any terms that could be used in such a question.

At block, 410 one or more question (or QA pair) associated with the rare entities (e.g., each of the rare entities, if possible) is generated. More specifically, question(s) may be generated based on the contextual data associated with the rare entities that was identified within the documents. In other words, questions are generated, which are answered by or within the identified contextual data associated with the rare entities. The type of question(s) generated may be determined by and/or based on entity type (i.e., the entity type of the rare entity and/or the entity type of any entity identified within the contextual data). Keywords, key phrases, etc. used or appearing in the questions may be captured or extracted from the contextual data found in the documents. In some embodiments, the system also identifies, tracks, and/or stores which particular document(s) within the corpus include the contextual data utilized to generate each question (or QA pair).

At block 412, additional forms of the questions are generated. More specifically, in some embodiments, for each answer associated with a particular generated question, additional forms (or phrasings, wording, etc.) of the question are generated (and stored). This process may be performed utilizing, for example, known question templates and detection/identification of acronyms, as is commonly understood.

The generated question(s) (and answer(s)) (or QA pair(s)) may then be utilized to train a chatbot or other similar system with respect to, for example, the particular domain(s) associated with the corpus. It should be understood that in some embodiments, the methods and systems described herein may be utilized in combination with other techniques used to manage and/or train chatbots, including the generation of QA pairs associated with entities that appear more frequently in the corpus (e.g., non-rare entities), as is commonly understood. After such a system is trained, a user may provide a question (e.g., via text-based methods, voice commands, etc.), and the system may utilize the QA pairs to generate an answer or other response/reply (e.g., via displaying the answer/response on a display screen of a computing device, generating an aural response, etc.).

Figure 5:
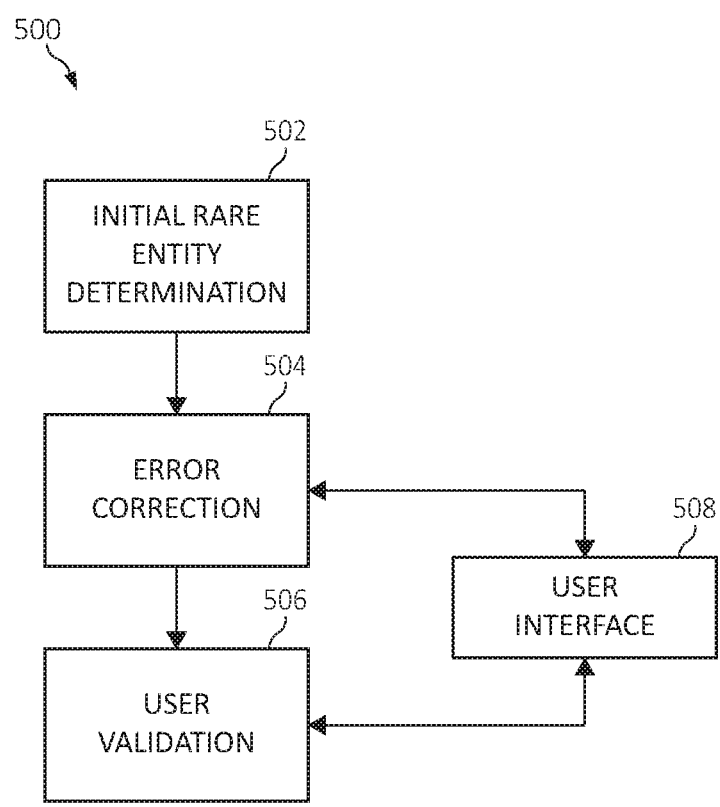
FIG. 5 is a block diagram of a method for identifying rare entities according to an embodiment of the present invention.

FIG. 5 illustrates a method (and/or system) 500 for identifying and/or determining rare entities (e.g., from all of the entities identified within a given corpus) according to an embodiment of the present invention. In the example shown, the method 500 includes an initial rare entity determination (block 502), an error correction process (block 504), and a user validation process (block 506). The method 500 shown in FIG. 5 may be performed, for example, within (or by) block 406 shown in FIG. 4.

Still referring to FIG. 5, at block 502, the initial rare entity determination (or identification) process is performed. As described above, the rare entity determination may be performed (automatically) utilizing a rareness criterion (or criteria) that is based on entity frequency and/or mention count. In some embodiments, one or more mention count thresholds are utilized. For example, the rare entities may be determined to be the entities that are mentioned less than a first (or maximum) threshold number of times and more than a second (or minimum) threshold number of times (e.g., one mention). As a more specific example, the rare entities may be selected as portion (e.g., a percentage, such as 10%) of the least occurring entities within the corpus, which may be combined with a minimum threshold. For example, if a total of 100 entities are identified within the corpus, the 10 entities with the fewest references (or the "bottom" 10%) may be determined to be rare entities, with entities that are mentioned only once in the corpus being discarded (or not included within the determined rare entities). In some embodiments, the manner in which the rare entities are initially determined/selected (or the rareness criteria) may be a configurable setting (e.g., via a setting/preferences functionality) so that the user(s) may adjust the initial determination of rare entities based on the particular application, personal preference, etc.

At block 504, the error correction is performed. In some embodiments, the error correction process includes generating a list of the entities selected as rare entities (e.g., at block 502) and providing the list to the user(s). For example, the list may be rendered or displayed utilizing a user interface (and/or computing device) 508. The user may be provided with the ability to adjust the selection (or list) of rare entities utilizing the user interface (e.g., via an appropriate user input device, such as a keyboard, mouse, etc.). As one example, the user may determine that one or more of the entities included on the list as rare entities is invalid and/or insignificant and manually remove such entities from the list. Similarly, if there is one or more entity that the user determines should be included, which is not on the list, the user may add such to the list.

Also (e.g., at block 504 or elsewhere in the method), the system may search the corpus for matches to the rare entities (e.g., regardless of whether or not the user adjusts the list of rare entities). For example, a "fuzzy" matching algorithm (or any other suitable algorithm/technique) may be utilized, which may take into consideration entity types (e.g., if an entity discovered via the fuzzy matching is of a type different than that of the respective rare entity, it may not be considered a match). Additionally, any entities discovered utilizing the fuzzy matching that have high reference counts (e.g., higher than the rareness criteria) may be discarded (or the user may be provided with an opportunity to discard or keep such entities via the user interface).

Additionally, the matching may be utilized to generate "composite" mention/reference counts for entities. For example, the matching may be utilized to associate a first entity identified within the corpus to a second entity within the corpus. In such an instance, the mention/reference counts of the entities may be added, and the sum may be associated with either of the entities (e.g., while the other entity is discarded). This composite count may then be utilized to determine if the first and/or second entity should be considered a rare entity (e.g., by applying the rareness criteria to the composite mention count).

Still referring to FIG. 5, at block 506, the user validation process is performed. In some embodiments, the user validation includes, for example, a list of "near miss" rare entities being generated and provided, which may be utilized by the user to further adjust (e.g., via the user interface 508) the rare entities for which QA pairs are generated. For example, if the initial identification of rare entities included entities that are referenced more than once in the corpus and less than the bottom n percent (e.g., 10%), the system may provide a list of entities that are referenced more than once and less than the bottom n+x percent (e.g., 10%+1%). The user may then opt whether or not to include such entities in the QA generation process (e.g., via the user interface 508). After the validation of the rare entities, the question (or QA pair) generation process may be performed as described above.

As one example of utilization of the methods and systems described herein, consider a domain related to a particular, exemplary organization, "Advanced Control Machines Enterprises" (or "ACME"). A corpus utilized to generate QA pairs may include research data from the organization (e.g., academic or scientific papers) and one or more website (or particular web page(s)) that includes information about the organization.

After identifying all of the entities within the corpus, the system may (e.g., utilizing the methods described above) determine the rare entities to include: Palo Alto, Calif. (or CA); Charlotte, N.C. (or NC); Knoxville, Tenn. (or TN); and Lenox, Mass. (or MA). The entity type for each of the rare entities may be determined to be "geopolitical entity" (or GPE) (or a location), as is commonly understood. Contextual data (or context) associated with the rare entities may include "ACME's principal offices and laboratories are located in Palo Alto, Calif.; Charlotte, N.C.; Knoxville, Tenn.; and Lenox, Mass." Identified context terms may include "context_term_org: ACME" and ""context_term_thing: principal offices, laboratories." Acronym conversion utilized may convert "ACME" to "Advanced Control Machines Enterprises."

In such a scenario, the entity type and variations may be related to GPE. An applicable question template may include "Where is the {context_term_thing} located for {context_term_org}?" As a result, a generated QA pair may include the question "Where is the principal office for ACME?" and the answer "Palo Alto, Calif.; Charlotte, N.C.; Knoxville, Tenn.; and Lenox, Mass." Additional forms or variations of the question may include, for example: "At what location is the principal office located for ACME?"; "At what location is the principal office located for Advanced Control Machines Enterprises?"; "Where is the principal office for ACME?"; "Where is the principal office for Advanced Control Machines Enterprises?"; "Where are ACME's labs at?"; "Where are ACME's laboratories?"; and "Where are ACME's laboratories located?"

As described above, such questions (or QA pairs) may be utilized to train chatbot-like systems, as well any other computing systems that are equipped with a question answering functionality (including Internet search engines).

Figure 6:
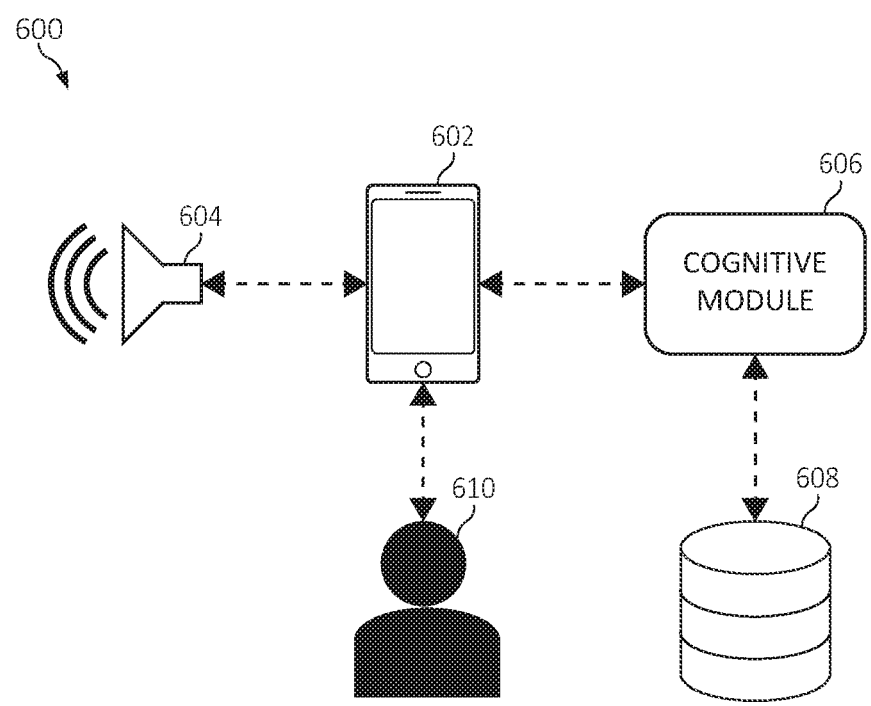
FIG. 6 is a block diagram of a computing environment according to an embodiment of the present invention.

Referring now to FIG. 6, an exemplary environment (e.g., computing environment or chatbot system) 600, which may make use of the methods and systems described herein, is shown. The environment includes (and/or has therein) a computing device 602, a speaker 604, a cognitive module 606, and a database 608. The computing device 602 may be any suitable computing device in (and/or through) which a chatbot (or any other similar system, including search engines) may be implemented (and/or utilized). In the example shown, the computing device 602 is a mobile electronic device (e.g., a mobile phone). Although not shown, the computing device 602 may include a microphone that may be used to detect or receive utterances (e.g., questions, voice commands, communications, etc.) from a user 610. However, it should be understood that in some embodiments communications may (also) be received through text-based methods (e.g., via a keyboard or touch pad on the computing device 602).

The speaker 604 may be any suitable electro-acoustic transducer (or loudspeaker) that is configured to render auditory (or audible or aural) responses from the chatbot. Although shown as a separate component, it should be understood that the speaker 604 may be integrated with the computing device 602, or another computing device, such as a desktop PC, audio system, smart television, etc.

The cognitive module 606 may include any suitable computing system or device that may be configured to any suitable processing on communications received from the user 610 (e.g., NLP processing, etc.). Although shown as a separate component (e.g., remotely located, on the "cloud," etc.), the cognitive module 606 may be (at least partially) integrated with the computing device 602. The cognitive module 606 is in operable communication (either directly or indirectly) with the computing device 602, the speaker 604, and the database 608. The database 608 may include any suitable memory or storage device (e.g., on the cloud) for storing data related to, for example, generating answers for received questions (e.g., via a display screen on the computing device 602 and/or the speaker 604) and/or performing other actions.

Figure 7:
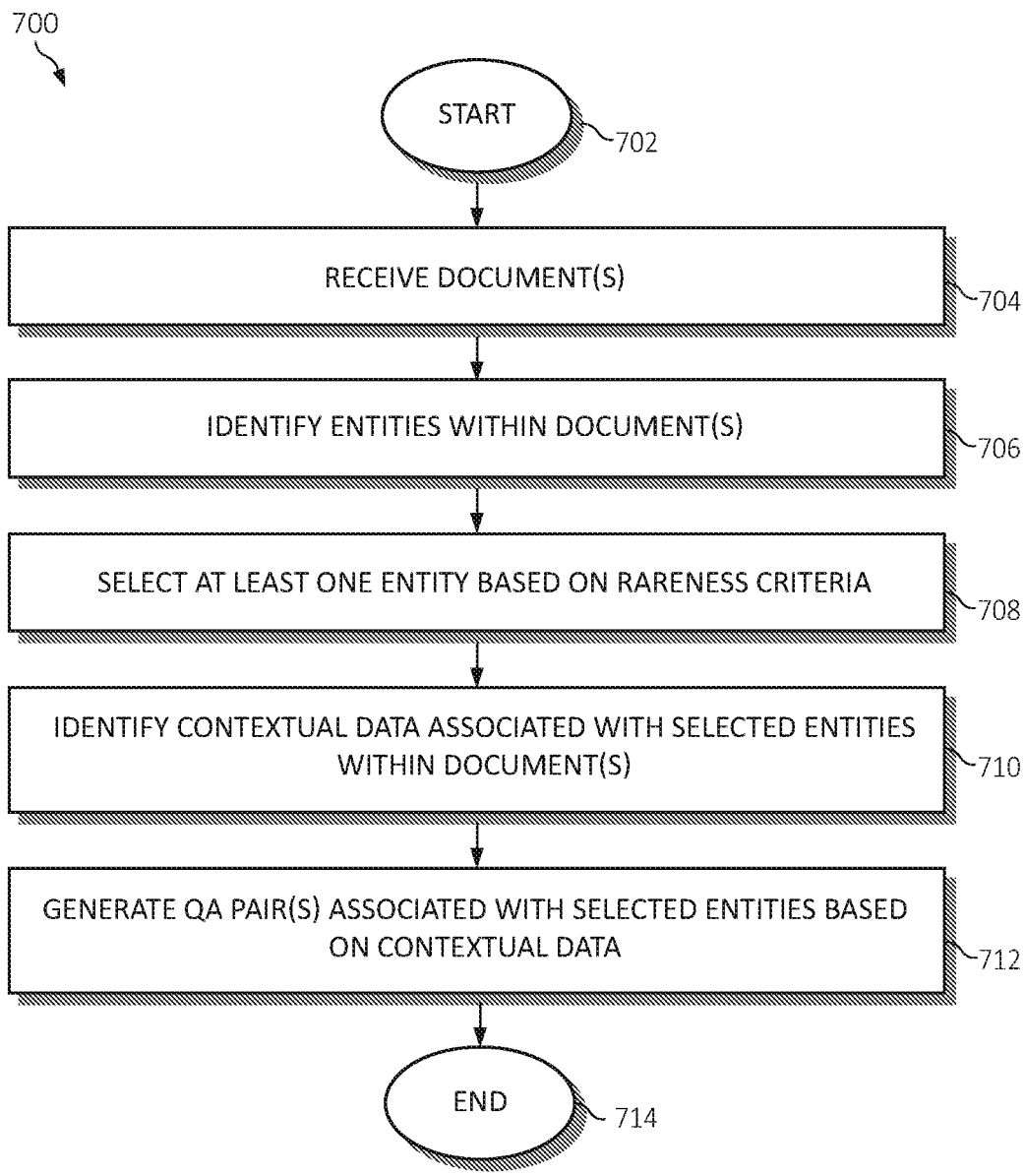
FIG. 7 is a flowchart diagram of an exemplary method for managing chatbots according to an embodiment of the present invention.

Turning to FIG. 7, a flowchart diagram of an exemplary method 700 for managing (or training) chatbots (or other similar systems) is provided. The method 700 begins (step 702) with, for example, a set of documents (or a corpus, one or more documents, etc.) being selected to be utilized to train and/or generate QA pairs for a chatbot system.

The set of documents is received (or retrieved, identified, etc.) (step 704). The document(s) may include one or more of any type of suitable document, file, database, etc., such as unstructured documents, websites, word processing documents, spreadsheets, electronic communications (e.g., emails, text messages, etc.), audio/video files, etc., that may be accessed (or received, etc.) and/or is searchable by the computing system performing the functionality described herein.

A plurality of entities are (or at least one entity is) identified within (and/or extracted from) the set of documents (step 706). This process may include determining a "type" for each entity. The entities (and/or the entity types) may include, for example, persons/individuals, objects, locations/addresses, organizations, events, works of art, consumer goods, phone numbers, dates/times, number, prices, etc. In some embodiments, the processing of the documents also includes determining a frequency for each of the identified entities. For example, the system may count/keep track of the number of references to and/or mentions of each of the entities (perhaps accounting for spelling errors, typographical errors, appositives, pronouns, etc.), as will be appreciated by one skilled in the art.

At least one of the plurality of entities is selected based on a rareness criteria (or criterion) (step 708). The selecting of the at least one of the plurality of entities based on the rareness criteria may include selecting those of the plurality of entities for which the number of references within the set of documents is less than a first predetermined threshold and greater than a second predetermined threshold. As a more specific example, the rare entities may be selected as portion (e.g., a percentage, such as 10%) of the least occurring entities within the corpus, which may be combined with a minimum threshold. For example, if a total of 100 entities are identified within the corpus, the 10 entities with the fewest references (or the "bottom" 10%) may be determined to be rare entities), with entities that are mentioned only once in the corpus being discarded (or not included within the determined/selected rare entities).

The selecting of the at least one of the plurality of entities based on a rareness criteria may include associating a first of the plurality of entities with a second of the plurality of entities based on a fuzzy matching algorithm. The first of the plurality of entities may have a first number of references in the set of documents, and the second of the plurality of entities may have a second number of references in the set of documents. The second number of references may be added to the first number of references to calculate a composite number of references for the first of the plurality of entities. The composite number of references may be utilized to determine if the first of the plurality of entities meets the rareness criteria.

Contextual data associated with each of the selected at least one of the plurality of entities is identified within the set of documents (step 710). The contextual data may include terms, phrases, etc., such as nouns, noun phrases, verb, verb phrases, and other descriptors, that are found "near" or "around" mentions of the rare entities within the documents, which provide information or "context" about the entities. For example, contextual data may appear in the same sentence, phrase, paragraph, etc. as an entity mention and/or within a predetermined "distance" of an entity mention (e.g., based on word count, alphanumeric character count, appearance in the previous or next sentence, etc.).

At least one question-answer (QA) pair associated with each of the selected at least one of the plurality of entities (i.e., the rare entities) is generated based on the identified contextual data (step 712). In other words, at least one question (or QA pairs) is generated, which is answered by or within the identified contextual data associated with the rare entities. The type of question(s) generated may be determined by and/or based on entity type (i.e., the entity type of the rare entity and/or the entity type of any entity identified within the contextual data). Keywords, key phrases, etc. used or appearing in the questions may be captured or extracted from the contextual data found in the documents. In some embodiments, the system also identifies, tracks, and/or stores which particular document(s) within the corpus include the contextual data utilized to generate each question (or QA pair). A chatbot system may then be caused to be trained utilizing the generated at least one QA pair.

In some embodiments, a user interface that allows a user to modify the selecting of the at least one of the plurality of entities (i.e., the rare entities) may be provided. The identifying of the contextual data associated with the selected at least one of the plurality of entities within the set of documents may include identifying contextual data associated with the modified at least one of the plurality of entities (i.e., the modified list of rare entities). The generating of the QA pair(s) may include generating a QA pair associated with each of the modified at least one of the plurality of entities.

Method 700 ends (step 714) with, for example, the trained chatbot system being utilized. For example, a user may provide an utterance (e.g., a question) to the system, for which the system generates a response (or answer) based on the generated QA pair(s). In some embodiments, feedback from users may (also) be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing a chatbot, by a processor, comprising:
   receiving a set of documents;
   identifying a plurality of entities within the set of documents, wherein the identifying of the plurality of entities includes determining a number of references to each of the plurality of entities within the set of documents;
   selecting at least one of the plurality of entities based on a rareness criteria, wherein the selecting of the at least one of the plurality of entities based on a rareness criteria includes:
      associating a first of the plurality of entities with a second of the plurality of entities based on a fuzzy matching algorithm, wherein the first of the plurality of entities has a first number of references in the set of documents, and the second of the plurality of entities has a second number of references in the set of documents;
      adding the second number of references to the first number of references to calculate a composite number of references for the first of the plurality of entities; and
      utilizing the composite number of references to determine if the first of the plurality of entities meets the rareness criteria;
   identifying contextual data associated with each of the selected at least one of the plurality of entities within the set of documents; and
   generating at least one question-answer (QA) pair associated with each of the selected at least one of the plurality of entities based on the identified contextual data.

2. The method of claim 1, wherein the selecting of the at least one of the plurality of entities based on the rareness criteria includes selecting those of the plurality of entities for which the number of references within the set of documents is less than a first predetermined threshold and greater than a second predetermined threshold.

3. The method of claim 1, further comprising providing a user interface that allows a user to modify the selecting of the at least one of the plurality of entities, and wherein the identifying of the contextual data associated with the selected at least one of the plurality of entities within the set of documents includes identifying contextual data associated with said modified at least one of the plurality of entities, and the generating of the at least one QA pair includes generating a QA pair associated with each of said modified at least one of the plurality of entities.

4. The method of claim 1, further comprising causing a chatbot system to be trained utilizing the generated at least one QA pair.

5. The method of claim 1, wherein each of the plurality of entities includes at least one of an individual, an object, and a location.

6. A system for managing a chatbot comprising:
   a processor executing instructions stored in a memory device, wherein the processor:
      receives a set of documents;
      identifies a plurality of entities within the set of documents, wherein the identifying of the plurality of entities includes determining a number of references to each of the plurality of entities within the set of documents;
      selects at least one of the plurality of entities based on a rareness criteria, wherein the selecting of the at least one of the plurality of entities based on a rareness criteria includes:
         associating a first of the plurality of entities with a second of the plurality of entities based on a fuzzy matching algorithm, wherein the first of the plurality of entities has a first number of references in the set of documents, and the second of the plurality of entities has a second number of references in the set of documents;
         adding the second number of references to the first number of references to calculate a composite number of references for the first of the plurality of entities; and
         utilizing the composite number of references to determine if the first of the plurality of entities meets the rareness criteria;
      identifies contextual data associated with each of the selected at least one of the plurality of entities within the set of documents; and
      generates at least one question-answer (QA) pair associated with each of the selected at least one of the plurality of entities based on the identified contextual data.

7. The system of claim 6, wherein the selecting of the at least one of the plurality of entities based on the rareness criteria includes selecting those of the plurality of entities for which the number of references within the set of documents is less than a first predetermined threshold and greater than a second predetermined threshold.

8. The system of claim 6, wherein the processor further provides a user interface that allows a user to modify the selecting of the at least one of the plurality of entities, and wherein the identifying of the contextual data associated with the selected at least one of the plurality of entities within the set of documents includes identifying contextual data associated with said modified at least one of the plurality of entities, and the generating of the at least one QA pair includes generating a QA pair associated with each of said modified at least one of the plurality of entities.

9. The system of claim 6, wherein the processor further causes a chatbot system to be trained utilizing the generated at least one QA pair.

10. The system of claim 6, wherein each of the plurality of entities includes at least one of an individual, an object, and a location.

11. A computer program product for managing a chatbot, by a processor, the computer program product embodied on a non-transitory computer-readable storage medium having computer-readable program code portions stored therein, the computer-readable program code portions comprising:
   an executable portion that receives a set of documents;
   an executable portion that identifies a plurality of entities within the set of documents, wherein the identifying of the plurality of entities includes determining a number of references to each of the plurality of entities within the set of documents;
   an executable portion that selects at least one of the plurality of entities based on a rareness criteria, wherein the selecting of the at least one of the plurality of entities based on a rareness criteria includes:

associating a first of the plurality of entities with a second of the plurality of entities based on a fuzzy matching algorithm, wherein the first of the plurality of entities has a first number of references in the set of documents, and the second of the plurality of entities has a second number of references in the set of documents;

adding the second number of references to the first number of references to calculate a composite number of references for the first of the plurality of entities; and utilizing the composite number of references to determine if the first of the plurality of entities meets the rareness criteria;

an executable portion that identifies contextual data associated with each of the selected at least one of the plurality of entities within the set of documents; and an executable portion that generates at least one question-answer (QA) pair associated with each of the selected at least one of the plurality of entities based on the identified contextual data.

12. The computer program product of claim 11, wherein the selecting of the at least one of the plurality of entities based on the rareness criteria includes selecting those of the plurality of entities for which the number of references within the set of documents is less than a first predetermined threshold and greater than a second predetermined threshold.

13. The computer program product of claim 11, wherein the computer-readable program code portions further include an executable portion that provides a user interface that allows a user to modify the selecting of the at least one of the plurality of entities, and wherein the identifying of the contextual data associated with the selected at least one of the plurality of entities within the set of documents includes identifying contextual data associated with said modified at least one of the plurality of entities, and the generating of the at least one QA pair includes generating a QA pair associated with each of said modified at least one of the plurality of entities.

14. The computer program product of claim 11, wherein the computer-readable program code portions further include an executable portion that causes a chatbot system to be trained utilizing the generated at least one QA pair.

15. The computer program product of claim 11, wherein each of the plurality of entities includes at least one of an individual, an object, and a location.

* * * * *